(12) United States Patent
Ahn

(10) Patent No.: US 11,913,541 B2
(45) Date of Patent: Feb. 27, 2024

(54) VEHICLE AND METHOD FOR CONTROLLING PARKING THEREOF

(71) Applicants: Hyundai Motor Company, Seoul (KR); Kia Corporation, Seoul (KR)

(72) Inventor: Jong Hoon Ahn, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 288 days.

(21) Appl. No.: 17/563,447

(22) Filed: Dec. 28, 2021

(65) Prior Publication Data
US 2022/0356943 A1 Nov. 10, 2022

(30) Foreign Application Priority Data

May 10, 2021 (KR) .................. 10-2021-0060023

(51) Int. Cl.
*F16H 61/00* (2006.01)
*F16H 63/48* (2006.01)
(Continued)

(52) U.S. Cl.
CPC ..... *F16H 61/0006* (2013.01); *F16H 61/0204* (2013.01); *F16H 63/483* (2013.01);
(Continued)

(58) Field of Classification Search
CPC .. F16H 61/0006; F16H 61/0204; F16H 61/16; F16H 61/20; F16H 63/483;
(Continued)

(56) References Cited

U.S. PATENT DOCUMENTS

2019/0168730 A1\* 6/2019 Park .................. B60T 7/22
2021/0039666 A1\* 2/2021 Jeong ............... B62D 15/0285

FOREIGN PATENT DOCUMENTS

| CN | 108238050 | * | 7/2018 |
| KR | 20140080774 | * | 7/2014 |

(Continued)

OTHER PUBLICATIONS

English translation of KR 20190049204 (Year: 2019).*
(Continued)

*Primary Examiner* — Russell Frejd
*Assistant Examiner* — Brandon Z Willis
(74) *Attorney, Agent, or Firm* — MORGAN, LEWIS & BOCKIUS LLP

(57) ABSTRACT

In a vehicle including a shift-by-wire (SBW) transmission which may be parked in the neutral gear position of the transmission, method for controlling parking thereof includes determining whether the vehicle is in a situation in which neutral parking is required according to sensor information, when the vehicle is stopped, outputting first information configured to get a confirmation on whether a driver intends to perform the neutral parking from the driver, when the controller concludes that the vehicle is in the situation in which the neutral parking is required and when a park (P) gear position is input or an ignition of the vehicle is turned off, and controlling the SBW transmission to shift to a neutral (N) gear position, when there is an agreement input as a response to the first information.

19 Claims, 6 Drawing Sheets

(51) Int. Cl.
  *F16H 61/02* (2006.01)
  *F16H 59/08* (2006.01)
  *F16H 61/22* (2006.01)
  *F16H 59/12* (2006.01)
  *F16H 61/32* (2006.01)
  *F16H 61/16* (2006.01)
  *F16H 59/10* (2006.01)

(52) U.S. Cl.
  CPC .............. *F16H 59/10* (2013.01); *F16H 59/12* (2013.01); *F16H 2059/081* (2013.01); *F16H 2061/0218* (2013.01); *F16H 2061/168* (2013.01); *F16H 2061/223* (2013.01); *F16H 2061/326* (2013.01)

(58) Field of Classification Search
  CPC .......... F16H 63/48; F16H 63/42; F16H 63/34; F16H 2063/423; F16H 2063/426; F16H 59/10; F16H 59/0204; F16H 59/70; F16H 59/68; F16H 59/12; F16H 59/44; F16H 2059/0221; F16H 2059/081; F16H 2059/708; F16H 2059/6823; F16H 2059/443; F16H 2059/446; F16H 2061/0218; F16H 2061/168; F16H 2061/223; F16H 2061/326; F16H 2061/207; F16H 2312/12; F16H 2312/16; F16H 2312/20; B60W 10/22; B60W 10/06; B60W 10/10; B60W 30/181; B60W 40/105; B60W 50/14; B60W 2050/146; B60W 2420/403; B60W 2420/42; B60W 2420/52; B60W 2420/54; B60W 2510/101; B60W 2510/1005; B60W 2520/04; B60W 2520/10; B60W 2540/16; B60W 2710/22; B60Y 2300/18091; B60Y 2400/30; B60Y 2400/77; B60Y 2400/76
  See application file for complete search history.

(56) References Cited

FOREIGN PATENT DOCUMENTS

| KR | 101462926 | * | 11/2014 |
|---|---|---|---|
| KR | 101671945 | * | 11/2016 |
| KR | 20190049204 | * | 5/2019 |

OTHER PUBLICATIONS

English translation of KR 20140080774 (Year: 2014).*
English translation of KR 101671945 (Year: 2016).*
English translation of KR 101462926 (Year: 2014).*
English translation of CN 108238050 (Year: 2018).*

* cited by examiner

FIG. 1
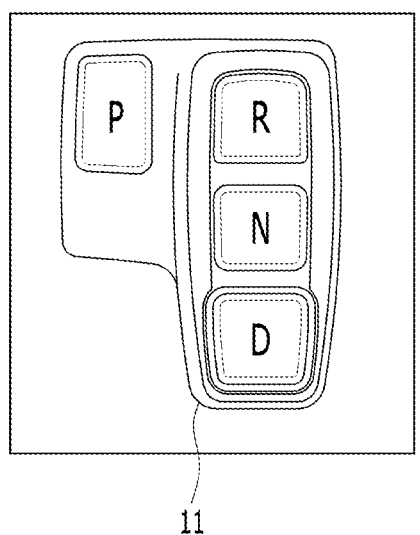
11
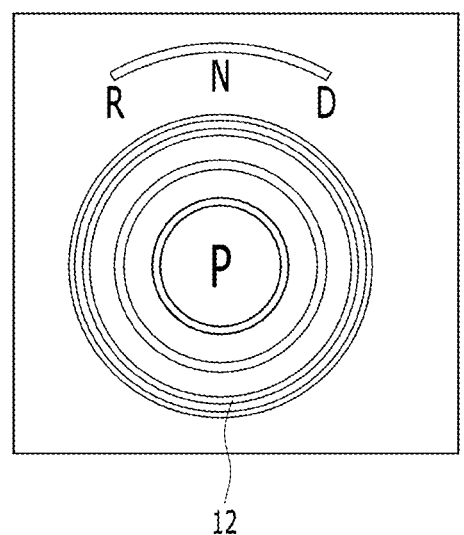
12
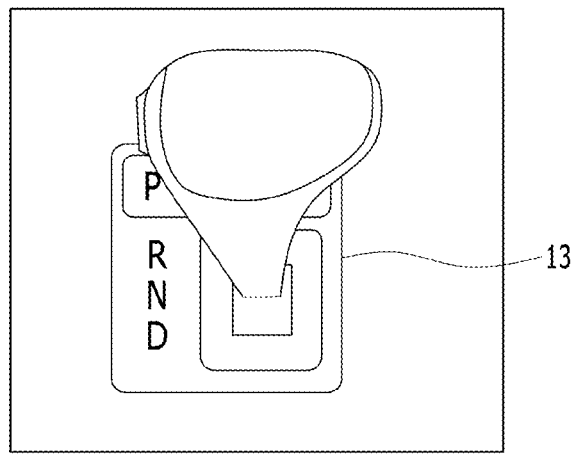
13

VEHICLE AND METHOD FOR CONTROLLING PARKING THEREOF

CROSS-REFERENCE TO RELATED APPLICATION

The present application claims priority to Korean Patent Application No. 10-2021-0060023, filed on May 10, 2021, the entire contents of which is incorporated herein for all purposes by this reference.

BACKGROUND OF THE INVENTION

Field of the Invention

The present invention relates to a vehicle including a shift-by-wire (SBW) transmission which may be more conveniently parked in the neutral gear position of the transmission, and a method for controlling parking thereof.

Description of Related Art

In general, a conventional transmission for vehicles is configured such that, as a driver operates a gear selector (for example, a shift lever), gear positions are changed through mechanical linkage. Recently, application of a shift-by-wire (SBW) transmission in which gear positions are changed through electronic control is being gradually increased. The SBW transmission does not require mechanical linkage between a gear selector and the transmission, and thus has advantages in that the gear selector may be comparatively freely designed, there are few restrictions on the disposed position thereof, and a small space for implementing the transmission is necessary compared to mechanical transmissions.

FIG. 1 illustrates various types of gear selectors which may be applied to a general SBW transmission.

Referring to FIG. 1, various types of gear selectors, such as a button-type gear selector 11 including a plurality of buttons corresponding to respective gear positions, a dial-type gear position selection 12 using a rotary dial, and a lever-type gear selector 13 similar to the shift lever applied to the mechanical transmissions, are implementable.

A driver of a vehicle having an automatic transmission generally allows the transmission in the P gear position when parking the vehicle, but finishes parking in the N gear position of the transmission (referred to as "neutral parking" for convenience) when the vehicle may be in a movable state by external force after parking. In the mechanical transmission, neutral parking is completed just by shifting a gear lever to the N gear position after parking but, in the shift-by-wire (SBW) transmission, when the ignition of a vehicle is off, the P gear position is automatically engaged regardless of a gear position before the ignition is off, for safety. Therefore, to allow the driver to perform neutral parking, the driver may successively finish a predetermined type of operation to maintain the N gear position of the transmission even when the ignition is off.

This will be described below with reference to FIG. 2.

FIG. 2 shows various types of guidance messages related to neutral parking.

Referring to FIG. 2, if the gear selector is the button-type gear selector 11 shown in FIG. 1, when the N button is operated after parking, a guidance message 21 "Please press the N button for a long time" is output through a display disposed on a cluster or the like. Furthermore, if the gest selector is the dial-type gear selector 12 shown in FIG. 1 or the lever-type gear selector 13 shown in FIG. 1, a guidance message 22 "Please operate the lever in the N gear position" is output by locating a dial or a lever at the N gear position. When such an operation is successively finished, the transmission shifts to the N gear position, and a message 23 "The transmission has shifted to the N gear position" is output.

As described above, in the vehicle having the SBW transmission, to perform neutral parking, the driver may perform such an inconvenient operation at all times at his or her own intention. Furthermore, operating methods for shifting to the N gear position are different depending on the types of the gear selectors or manufacturers thereof, it is difficult to intuitively recognize the operating methods, and thus, guidance information may be referred to and thereby causes driver inconvenience.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle and method for controlling parking thereof that substantially obviate one or more problems due to limitations and disadvantages of the related art.

Various aspects of the present invention are directed to providing a vehicle including a shift-by-wire (SBW) transmission which may be more conveniently parked in the neutral gear position of the transmission, and a method for controlling parking thereof.

Additional advantages, objects, and features of the present invention will be set forth in part in the description which follows and in part will become apparent to those having ordinary skill in the art upon examination of the following, or may be learned from practice of the present invention. The objectives and other advantages of the present invention may be realized and attained by the structure particularly pointed out in the written description and claims hereof as well as the appended drawings.

To achieve these objects and other advantages and in accordance with the present invention, as embodied and broadly described herein, a method for controlling parking of a vehicle including a shift-by-wire (SBW) transmission includes determining whether the vehicle is in a situation in which neutral parking is required according to sensor information, when the vehicle is stopped, outputting first information configured to get a confirmation on whether a driver intends to perform the neutral parking from the driver, when the controller concludes that the vehicle is in the situation in which the neutral parking is required and when a park (P) gear position is input or an ignition of the vehicle is turned off, and controlling the SBW transmission to shift to a neutral (N) gear position, when there is an agreement input as a response to the first information.

In another aspect of the present invention, a vehicle includes a shift-by-wire (SBW) transmission, at least one sensor, an input/output unit, and a controller configured to determine whether the vehicle is in a situation in which neutral parking is required according to sensor information provided by the at least one sensor, when the vehicle is stopped, to output first information configured to get a confirmation on whether a driver intends to perform the neutral parking from the driver through the input/output unit, when the controller concludes that the vehicle is in the situation in which the neutral parking is required and when a park (P) gear position is input or an ignition of the vehicle is turned off, and to control the SBW transmission to shift to a neutral (N) gear position, when there is an agreement input as a response to the first information.

It is to be understood that both the foregoing general description and the following detailed description of the present invention are exemplary and explanatory and are intended to provide further explanation of the present invention as claimed.

The methods and apparatuses of the present invention include other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1 is a view exemplarily illustrating various types of gear selectors which may be applied to a general SBW transmission;

Figure 2:
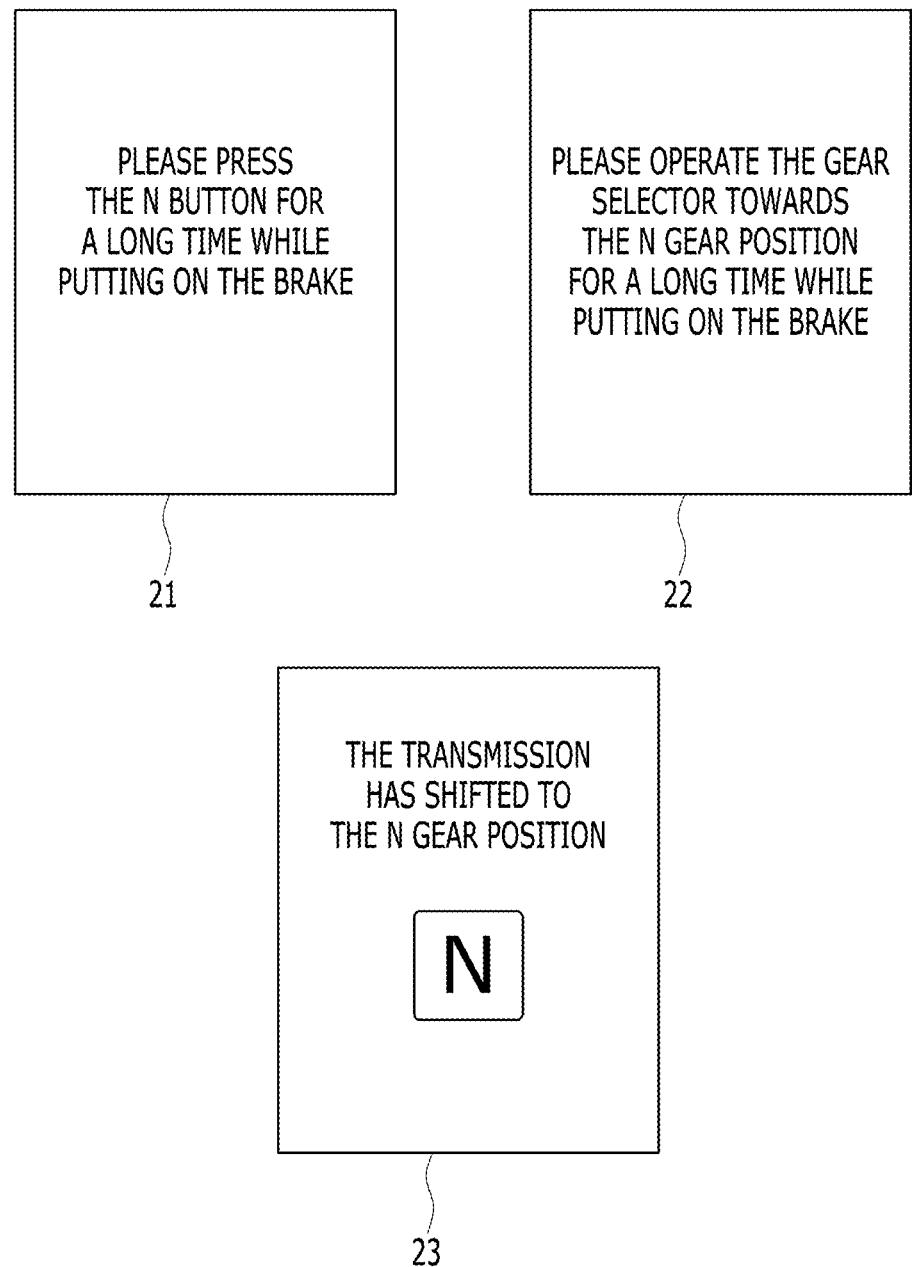
FIG. 2 is a view showing various types of guidance messages related to neutral parking.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Reference will now be made in detail to exemplary embodiments of the present invention, examples of which are illustrated in the accompanying drawings. However, the present invention is not limited to the exemplary embodiments set forth herein and may be variously modified. In the drawings, to clearly describe the present invention, descriptions of elements which are not related to the present invention are omitted, and the same or similar elements are denoted by the same reference numerals even when they are depicted in different drawings.

In the following description of the embodiments, it will be understood that, when a part "includes" an element, the part may further include other elements, and does not exclude the presence of such other elements, unless stated otherwise. Furthermore, in the following description of the embodiments, parts denoted by the same reference numerals indicate the same elements.

Various exemplary embodiments of the present invention suggest a method in which, when a vehicle including a shift-by-wire (SBW) transmission recognizes a situation in which neutral parking is required, it is confirmed whether a driver intends to perform neutral parking, and the transmission is maintained in the N gear position when the vehicle is parked, upon confirming that the driver intends to perform neutral parking.

First, the configuration of a vehicle to perform a method for controlling parking of the vehicle according to an exemplary embodiment will be described with reference to FIG. 3.

Figure 3:
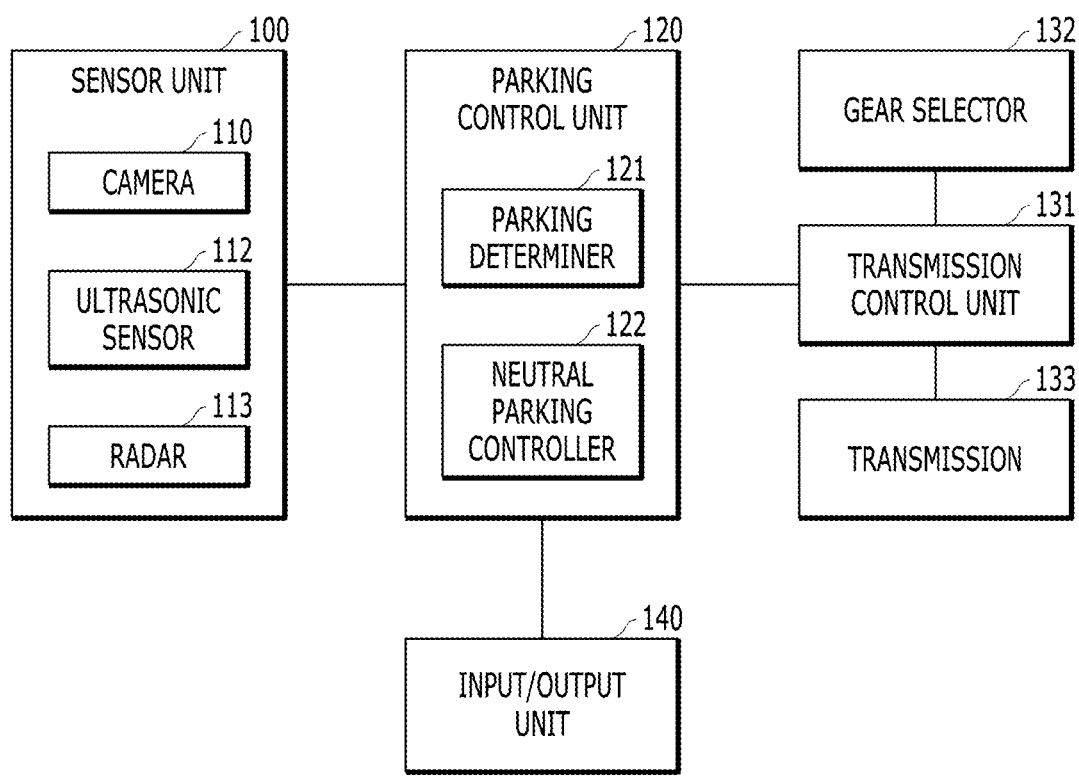
FIG. 3 is a block diagram illustrating one example of the configuration of a vehicle according to various exemplary embodiments of the present invention.

FIG. 3 is a block diagram illustrating one example of the configuration of the vehicle according to various exemplary embodiments of the present invention.

Referring to FIG. 3, a vehicle 100 according to various exemplary embodiments of the present invention may include a sensor unit 10, a parking control unit 120, a transmission control unit 131, a gear selector 132, a transmission 133 and an input/output unit 140.

The respective elements shown in FIG. 3 are related to the exemplary embodiments of the present invention, and in implementation of an actual vehicle, some elements may be omitted or a larger number of elements may be provided.

Although the sensor unit 110 according to the present exemplary embodiment includes at least one camera 111 configured to capture the surroundings of the vehicle, and a plurality of ultrasonic sensors 112 and radars 113 configured to measure a distance from an obstacle around the vehicle, these elements are exemplary and the sensor unit 110 may include any types of sensors which may detect a situation around the vehicle without being limited thereto.

The parking control unit 120 may include a parking determiner 121, and a neutral parking controller 122.

The parking determiner 121 may activate at least a part of the sensor unit 110 by determining whether parking is now underway or whether parking is expected to be performed based on various pieces of information. For example, the parking determiner 121 may activate at least a part of the sensor unit 110 when the transmission 133 is in the drive (D) gear position or the reverse (R) gear position and a vehicle speed is equal to or lower than a predetermined speed. Furthermore, the parking determiner 121 may activate at least a part of the sensor unit 110 in a situation, such as a case in which the current position of the vehicle detected by a navigation system is close to a destination of the vehicle or enters a parking lot, or a case in which a Global Positioning System (GPS) signal is lost around a building (i.e., the vehicle enters an underground parking lot). Furthermore, the parking determiner 121 may determine that parking is now underway or parking is expected to be performed, in a case in which the driver inputs an operation for activating at least some of the cameras 111 (for example, in a case in which an around view monitor is turned on).

The neutral parking controller 122 may determine whether the vehicle is in a situation in which neutral parking is required by obtaining various pieces of sensing information from the activated sensor unit 110 until parking is completed, when the parking determiner 121 determines that parking is now underway or parking is expected to be performed. A detailed description of the determination method of the neutral parking controller 122 will be provided below with reference to FIG. 4. When the driver selects the park (P) gear position through the gear selector 122 or turns off the ignition upon determining that the vehicle is in the situation in which the neutral parking is required, the neutral parking controller 122 may confirm whether the driver intends to perform neutral parking through the input/output unit 140, may ask the transmission control unit 131 to maintain the transmission in the neutral (N) gear position or the park (P) gear position depending on a result of confirmation, and may inform the driver of a result of control through the input/output unit 140.

Depending on embodiments, the parking determiner 121 may be omitted, and the neutral parking controller 122 may be implemented to determine whether parking is completed (for example, whether a vehicle speed is maintained at 0 for a designated time or the N gear position or whether the P gear position is input through the gear selector 132), and to determine whether neutral parking is required by activating at least a part of the sensor unit 110 at a corresponding point in time upon determining that parking is completed.

The transmission control unit (TCU) 131 may electronically control the gear positions of the transmission 133 depending on the user command input through the transmission gear selector 132 or a vehicle situation, for example, a request from the neutral parking controller 122.

The input/output unit 140 may include at least one driver command input unit and at least one output unit. For example, the driver command input unit may include at least one of a touchscreen, key buttons, a dial or a lever, and the output unit may include at least one of a display, a speaker or a warning light, without being limited thereto. For example, the input/output unit 140 may include a speaker and a display of a cluster as the output unit, and may include steering wheel buttons as the input unit.

Here, the term unit or control unit included in the names of the parking control unit 120, the transmission control unit (TCU) 131, etc. is widely used to refer to a controller configured to control a specific function of the vehicle, and does not indicate a generic function unit. For example, each of the respective control units may include a communication device configured to communicate with other controllers or sensors to control relevant functions, a memory configured to store an operating system or logic commands and input and output information, and one or more processors configured to perform determination, calculation, etc. necessary to control the relevant functions.

Figure 4:
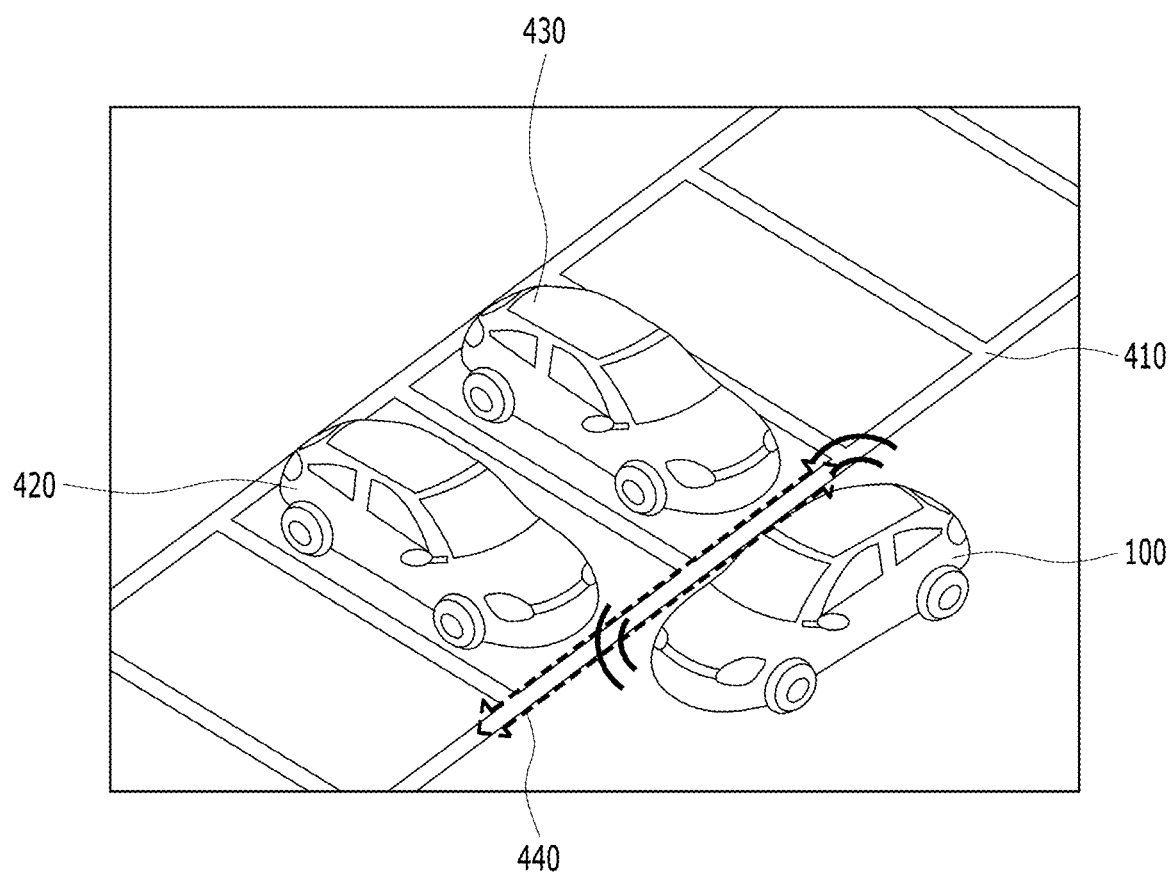
FIG. 4 is a view exemplarily illustrating a situation in which neutral parking is required, according to various exemplary embodiments of the present invention.

FIG. 4 is a view exemplarily illustrating a situation in which neutral parking is required, according to various exemplary embodiments of the present invention.

FIG. 4 illustrates a situation in which a vehicle 100 according to various exemplary embodiments of the present invention enters a parking lot in a situation in which there are vehicles 420 and 430 parked in advance inside parking lines 410 of the parking lot.

The situation in which the neutral parking is required may include a situation in which, when there are peripheral vehicles 420 and 430 parked in advance in parallel along one direction 440, the vehicle 100 is parked adjacent to the peripheral vehicles 420 and 430 such that the longitudinal direction of the vehicle 100 is substantially parallel to the direction 440, i.e., a parallel parking situation. However, the present situation is only exemplary, and the present invention is not limited thereto. For example, the situation in which the neutral parking is required may include a situation in which the host vehicle 100 is parked outside the parking lines 410 to block the exit direction of the peripheral vehicles 420 and 430 parked inside the parking lines 410, or a situation in which the host vehicle 100 is parked such that the longitudinal direction of the host vehicle 100 is substantially parallel to a designated length or more of the parking line 410 regardless of peripheral vehicles 420 and 430.

Figure 5:
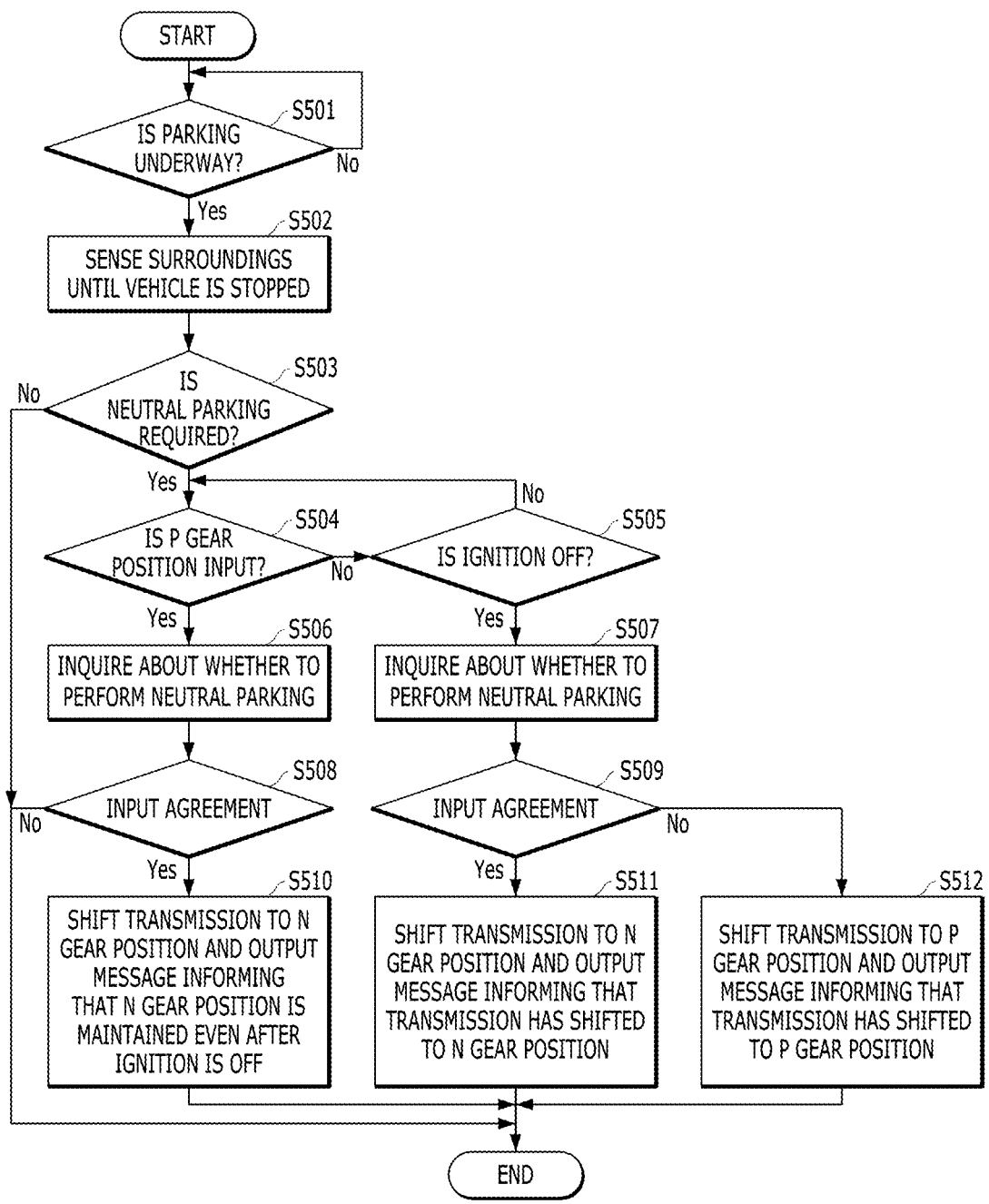
FIG. 5 is a flowchart representing one example of a process for controlling parking of a vehicle according to various exemplary embodiments of the present invention.
Figure 6:
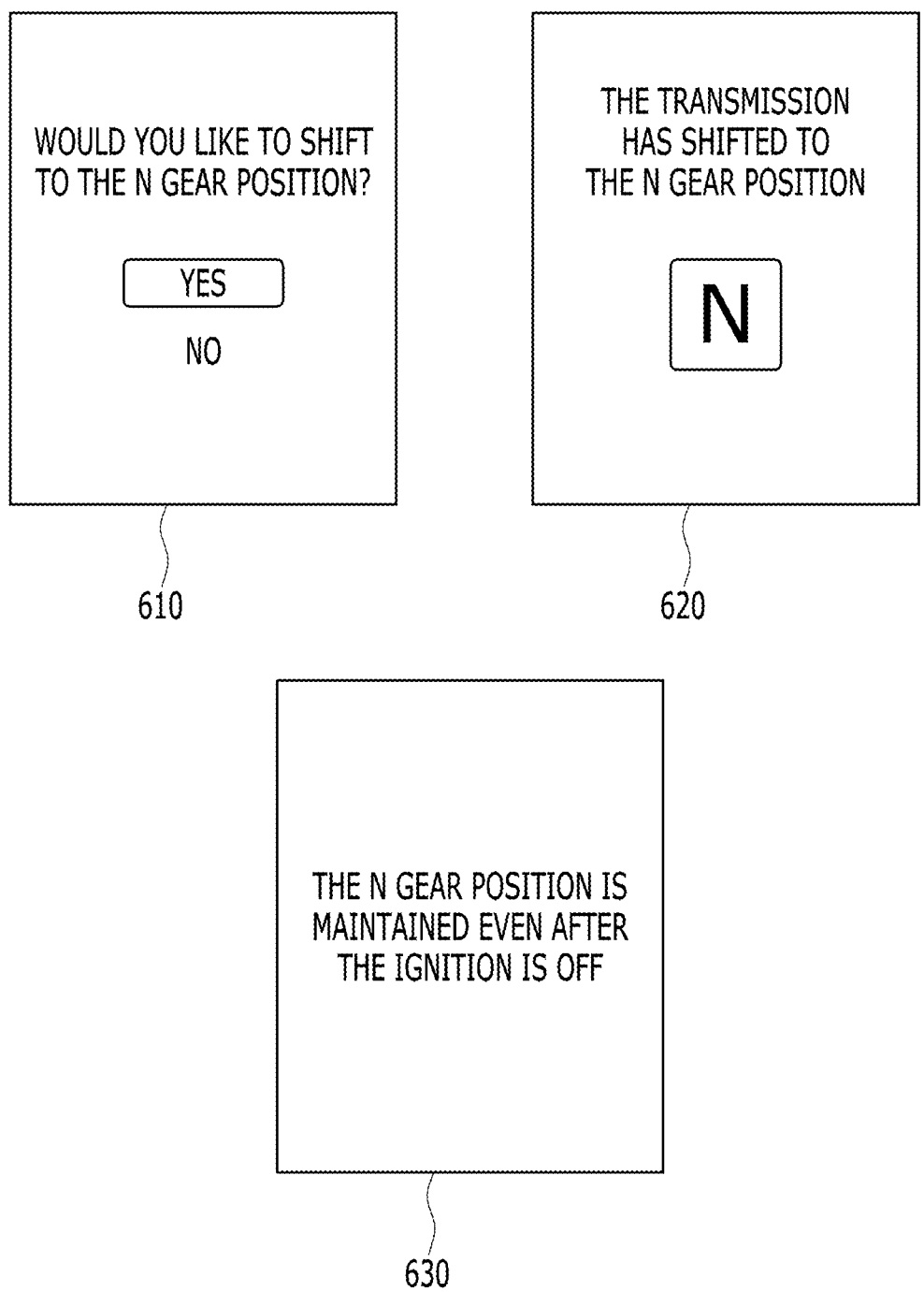
FIG. 6 is a view showing various types of guidance messages provided during the process according to various exemplary embodiments of the present invention.

FIG. 5 is a flowchart representing one example of a process for controlling parking of a vehicle according to various exemplary embodiments of the present invention, and FIG. 6 is a view showing various types of guidance messages provided during the process according to various exemplary embodiments of the present invention.

Referring to FIG. 5 and FIG. 6, when the parking determiner 121 of the parking control unit 120 determines that parking is now underway or whether parking is expected to be performed (Yes in S501), the neutral parking controller 122 may detect surroundings by obtaining various pieces of sensing information from the sensor unit 110 activated until parking is completed (i.e., the vehicle is stopped) (S502), and may determine whether the vehicle is in a situation in which neutral parking is required (S503).

A method for determining whether the vehicle is in the situation in which the neutral parking is required is the same as the above description referring to FIG. 4, and a description thereof will thus be omitted.

Upon determining that the vehicle is in the situation in which the neutral parking is required (Yes in S503), the neutral parking controller 122 confirms whether there is an input of the P gear position (S504).

When the transmission shifts to the P gear position (Yes in S504), a message inquiring of a driver about whether to perform neutral parking through the input/output unit 140 (for example, a message 610 in FIG. 6) may be output (S506). When the driver inputs a command indicating agreement about neutral parking (Yes in S508), the neutral parking controller 122 may ask the transmission control unit 131 to shift to the N gear position, and may output a message informing that the N gear position is maintained even after the ignition is off through the input/output unit 140 (for example, a message 630 in FIG. 6) (S510).

When the driver does not input the P gear position through the gear selector 132 (No in S504) and turns the ignition off (Yes in S505), the neutral parking controller 122 may output a message inquiring of the driver about whether to perform neutral parking through the input/output unit 140 (S507). When the driver inputs a command indicating agreement about neutral parking (Yes in S509), the neutral parking controller 122 may ask the transmission control unit 131 to shift to the N gear position, and may output a message informing that the transmission has shifted to the N gear position through the input/output unit 140 (for example, a message 620 in FIG. 6) (S511).

On the other hand, when the driver inputs a command indicating disagreement about neutral parking (No in S509), the neutral parking controller 122 may ask the transmission control unit 131 to shift to the P gear position, and may output a message informing that the transmission has shifted to the P gear position through the input/output unit 140 (S512).

Furthermore, although FIG. 5 illustrates the exemplary embodiment in which the parking determiner 121 is involved, in another exemplary embodiment of the present invention, Operations S501 and S502 may be replaced with an operation of sensing surroundings through sensing information from the sensor unit 110 at a point in time when the vehicle is stopped.

According to the above-described embodiments of the present invention, the vehicle determines the situation in which the neutral parking is required and inquires of the driver about whether to perform neutral parking, and thus, the vehicle may be easily parked in the N gear position through one operation. Furthermore, when the ignition of the conventional vehicle including a shift-by-wire transmission is off under the condition that the transmission is in the N gear position, the transmission automatically shifts to the P gear position, and thus, the transmission may be operated to perform neutral parking after the ignition is off, but, according to these embodiments, the vehicle may be parked in the N gear position of the transmission without turning the ignition off.

The present invention may be implemented as computer readable code in a computer readable recording medium in which programs are recorded. Such computer readable recording media may include all kinds of recording media in which data readable by computer systems is stored. For example, the computer readable recording media may include a hard disk drive (HDD), a solid-state drive (SSD), a silicon disk drive (SDD), a ROM, a RAM, a CD-ROM, a magnetic tape, a floppy disk, an optical data storage device, etc.

As is apparent from the above description, a vehicle including a shift-by-wire (SBW) transmission according to at least various exemplary embodiments of the present invention may recognize a situation in which neutral parking is required and enable a driver to conveniently select whether to perform neutral parking.

Therefore, the driver may conveniently perform neutral parking of the vehicle without learning a method for operating the transmission to perform neutral parking.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method for controlling parking of a vehicle including a shift-by-wire (SBW) transmission, the method comprising:

determining, by a controller, whether the vehicle is in a situation in which neutral parking is required according to sensor information, when the vehicle is stopped;

outputting, by the controller, first information configured to get a confirmation on whether a driver intends to perform the neutral parking from the driver, when the controller concludes that the vehicle is in the situation in which the neutral parking is required and when a park (P) gear position is input or an ignition of the vehicle is turned off; and controlling, by the controller, the SBW transmission to shift to a neutral (N) gear position, when there is an agreement input as a response to the first information.

2. The method of claim 1, further including:

outputting, by the controller, second information configured to indicate that the N gear position is maintained even after the ignition is turned off, when the first information is output as the P gear position is input, and there is the agreement input.

3. The method of claim 1, further including:

outputting, by the controller, third information configured to indicate that the SBW transmission shifts to the N gear position, when the first information is output as the ignition is turned off without input of the P gear position, and there is the agreement input.

4. The method of claim 1, further including:

controlling, by the controller, the SBW transmission to shift to the P gear position, when the first information is output as the ignition is turned off without input of the P gear position, and there is a disagreement input as the response to the first information.

5. The method of claim 4, further including:

when there is the disagreement input, outputting a message informing that the transmission has shifted to the P gear position through the input/output unit.

6. The method of claim 1, wherein the situation in which the neutral parking is required includes at least one of a case in which the vehicle is parked adjacent to peripheral vehicles parked in parallel in one direction such that a longitudinal direction of the vehicle is parallel to the one direction, a case in which the vehicle is parked outside parking lines to block an exit direction of peripheral vehicles parked inside the parking lines, or a case in which the vehicle is parked such that the longitudinal direction of the vehicle is parallel to a predetermined length or more of a parking line.

7. The method of claim 1, further including:

before the determining whether the vehicle is in the situation in which the neutral parking is required, determining, by the controller, whether the parking of the vehicle is underway or whether the parking is expected to be performed; and activating, by the controller, at least one sensor configured to provide the sensor information, upon determining that parking is underway or that parking is expected to be performed.

8. The method of claim 7, wherein, in the determining whether the parking of the vehicle is underway or whether the parking is expected to be performed, the controller concludes that the parking is underway or that the parking is expected to be performed, when a current gear position of the SBW transmission is a drive (D) gear position or a reverse (R) gear position and a vehicle speed is equal to or lower than a predetermined speed, when a current position of the vehicle detected by a navigation system is close to a destination of the vehicle or enters a parking lot, when a Global Positioning System (GPS) signal is lost, or when a command configured to activate the at least one sensor is input.

9. The method of claim 7, wherein the at least one sensor includes at least one of an ultrasonic sensor, a camera or a radar.

10. A non-transitory computer readable recording medium having recorded thereon a program to execute the method of claim 1.

11. A vehicle comprising:
a shift-by-wire (SBW) transmission;
at least one sensor;
an input/output unit; and
a controller electrically connected to the SBW transmission, the at least one sensor and the input/output unit and configured to determine whether the vehicle is in a situation in which neutral parking is required according to sensor information provided by the at least one sensor, when the vehicle is stopped, to output first information configured to get a confirmation on whether a driver intends to perform the neutral parking from the driver through the input/output unit, when the controller concludes that the vehicle is in the situation in which the neutral parking is required and when a park (P) gear position is input or an ignition of the vehicle is turned off, and to control the SBW transmission to shift to a neutral (N) gear position, when there is an agreement input as a response to the first information.

12. The vehicle of claim 11, wherein the controller is configured to output second information configured to indicate that the N gear position is maintained even after the ignition is turned off through the input/output unit, when the first information is output as the P gear position is input, and there is the agreement input.

13. The vehicle of claim 11, wherein the controller is configured to output third information configured to indicate that the SBW transmission shifts to the N gear position through the input/output unit, when the first information is output as the ignition is turned off without input of the P gear position, and there is the agreement input.

14. The vehicle of claim 11, wherein the controller is configured to control the SBW transmission to shift to the P gear position, when the first information is output as the ignition is turned off without input of the P gear position, and there is a disagreement input as the response to the first information.

15. The vehicle of claim 14, wherein when there is the disagreement input, the controller is configured to output a message informing that the transmission has shifted to the P gear position through the input/output unit.

16. The vehicle of claim 11, wherein the situation in which the neutral parking is required includes at least one of a case in which the vehicle is parked adjacent to peripheral vehicles parked in parallel in one direction such that a longitudinal direction of the vehicle is parallel to the one direction, a case in which the vehicle is parked outside parking lines to block an exit direction of peripheral vehicles parked inside the parking lines, or a case in which the vehicle is parked such that the longitudinal direction of the vehicle is parallel to a predetermined length or more of a parking line.

17. The vehicle of claim 11, wherein the controller is configured to determine whether parking of the vehicle is underway or whether the parking is expected to be performed, and to activate the at least one sensor, upon determining that the parking is underway or that the parking is expected to be performed.

18. The vehicle of claim 17, wherein the controller is configured to determine that the parking is underway or that parking is expected to be performed, when a current gear position of the SBW transmission is a drive (D) gear position or a reverse (R) gear position and a vehicle speed is equal to or lower than a predetermined speed, when a current position of the vehicle detected by a navigation system is close to a destination of the vehicle or enters a parking lot, when a Global Positioning System (GPS) signal is lost, or when a command configured to activate the at least one sensor is input.

19. The vehicle of claim 11, wherein the at least one sensor includes at least one of an ultrasonic sensor, a camera and a radar.

* * * * *